Figure 2:
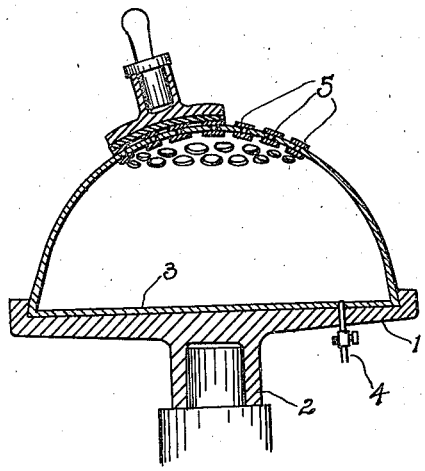

H. O. GOWLLAND.
SMOOTHING HEAD FOR MANUFACTURING EYEGLASS LENSES.
APPLICATION FILED JUNE 14, 1915.

1,212,628.

Patented Jan. 16, 1917.

Henry Orford Gowlland
Inventor

By M. S. Babcock

Attorney.

UNITED STATES PATENT OFFICE.

HENRY ORFORD GOWLLAND, OF MONTREAL, QUEBEC, CANADA.

SMOOTHING-HEAD FOR MANUFACTURING EYEGLASS-LENSES.

1,212,628.

Specification of Letters Patent. Patented Jan. 16, 1917.

Original application filed March 3, 1915, Serial No. 11,925. Divided and this application filed June 14, 1915. Serial No. 34,123.

*To all whom it may concern:*

Be it known that I, HENRY O. GOWLLAND, a subject of the King of Great Britain, residing at Montreal, in the Province of Quebec, Dominion of Canada, have invented new and useful Improvements in Smoothing-Heads for Manufacturing Eyeglass-Lenses, of which the following is a specification.

The present invention relates to smoothing heads for manufacturing eyeglass lenses.

This application is a division of application Serial No. 11,925, filed March 3rd, 1915.

To more clearly disclose the construction, operation and use of the invention reference should be had to the accompanying drawings forming part of this application.

Throughout the several figures of the drawings like reference characters designate the same parts.

Figure 1:
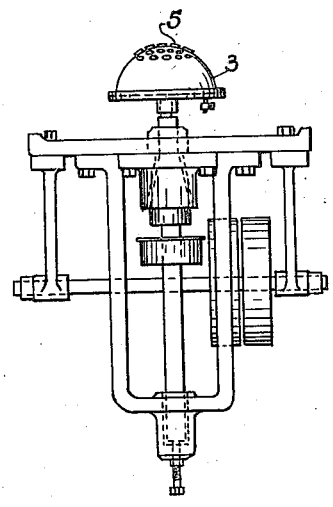

In the drawings:—Figure 1, is a front view of a well known type of smoothing machine with the invention applied; and Fig. 2, is an enlarged central vertical cross section through the head.

The main object of this invention is to provide a smoothing head which will accurately and instantaneously adapt itself at all points to the exact curvature of the lens, while at the same time presenting an operative smoothing surface which will adequately cut away or smooth out the myriad exceedingly small ridges or ribs left by the grinding operation. In this way, the final curvature of the lens is produced by the first grinding operation and is not in any manner changed by the smoothing operation.

The present head comprises a flanged disk 1, with cylindrical boss 2, for connecting it to the spindle of any well known type of smoothing machine, like the one shown in Fig. 1, of the drawings, for instance. In this disk is seated a pneumatic head 3, which is inflated through a suitable air pipe 4. The head is made of any suitable flexible air tight material. It is provided with a large number of smoothing elements such as very small studs, disks, or plates 5, of metal or any other suitable abrading material. These elements are slightly spaced apart so that every one is entirely independent of all others in its movements. They may be riveted in as shown, or clamped in, or embedded, or in any other manner secured to or in the material of the head. This construction provides a yielding operative surface which automatically adapts itself to the exact curvature of the lens at all times throughout the smoothing process.

In operation, the operative face of the head is pressed on the lens and turned in contact therewith, the movement of said head being rotary about an axial line passing longitudinally through the center of the handle and boss 2 and also through the center of the operative face of the head.

The essential feature of course, is to have the head of a yielding and elastic construction so that its surface adapts itself accurately and instantaneously at all points to the exact curvature of the glass during the smoothing operation. The pneumatic head is preferred, though it is to be clearly understood that all other heads having a yielding elastic surface are to be included within the scope of the claim of this application.

It is clear that the details of the invention may be changed in many ways without departing from the field and scope of the invention and it is meant to include all such changes in this application, wherein only a preferred form has been disclosed.

Having described my invention, what I do claim and desire to secure by Letters Patent is:—

A rotary smoothing tool for finishing lenses, consisting of a pneumatically inflated convex head and a plurality of separate and independent smoothing elements separately secured to the working face of said head in spaced apart relation.

Signed at Montreal, Quebec, Canada, this 10th day of June, 1915.

HENRY ORFORD GOWLLAND.

Witnesses:
 W. S. BABCOCK,
 L. WHITESID.